(12) United States Patent
Zhang et al.

(10) Patent No.: US 11,010,041 B2
(45) Date of Patent: May 18, 2021

(54) METHOD AND APPARATUS FOR DISPLAYING INTERFACE

(71) Applicant: Baidu Online Network Technology (Beijing) Co., Ltd., Beijing (CN)

(72) Inventors: Yaqian Zhang, Beijing (CN); Hao Dong, Beijing (CN); Qinggeng Qian, Beijing (CN); Peng Wang, Beijing (CN); Yong Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/351,105

(22) Filed: Mar. 12, 2019

(65) Prior Publication Data

US 2020/0004397 A1    Jan. 2, 2020

(30) Foreign Application Priority Data

Jun. 29, 2018   (CN) .......................... 201810699352.9

(51) Int. Cl.
*G06F 3/0487* (2013.01)
*G06F 3/0482* (2013.01)
*G06F 3/16* (2006.01)
*G06F 9/30* (2018.01)

(52) U.S. Cl.
CPC ............ *G06F 3/0487* (2013.01); *G06F 3/167* (2013.01); *G06F 9/3004* (2013.01)

(58) Field of Classification Search
CPC ............................... G06F 16/24; G06F 3/0487
See application file for complete search history.

(56) References Cited

U.S. PATENT DOCUMENTS

| 6,466,971 | B1* | 10/2002 | Humpleman | H04L 12/2803 |
| | | | | 709/203 |
| 2012/0139951 | A1* | 6/2012 | Hwang | H04N 21/4312 |
| | | | | 345/665 |
| 2013/0017789 | A1* | 1/2013 | Chi | G02B 27/01 |
| | | | | 455/41.2 |
| 2014/0067094 | A1* | 3/2014 | Park | H04W 12/06 |
| | | | | 700/90 |
| 2014/0280580 | A1* | 9/2014 | Langlois | B60K 37/06 |
| | | | | 709/204 |
| 2017/0242557 | A1* | 8/2017 | Rotschield | H04L 41/22 |

FOREIGN PATENT DOCUMENTS

| CN | 104065953 A | 9/2014 |
| CN | 104156306 A | 11/2014 |
| CN | 107247593 A | 10/2017 |
| JP | 2008078696 A | 4/2008 |
| JP | 2013025883 A | 10/2013 |
| JP | 2018042254 A | 3/2018 |

* cited by examiner

*Primary Examiner* — Rayeez R Chowdhury
(74) *Attorney, Agent, or Firm* — Nixon Peabody LLP

(57) ABSTRACT

Embodiments of the present disclosure disclose a method and apparatus for displaying an interface. A specific embodiment of the method comprises: acquiring device related information of a connected device; querying display interface information corresponding to the device related information of the connected device; and displaying a corresponding interface based on the display interface information. According to the embodiment, a smart terminal can display the corresponding interface according to the connected device, thereby improving the efficiency of acquiring the information by the user.

17 Claims, 6 Drawing Sheets

METHOD AND APPARATUS FOR DISPLAYING INTERFACE

CROSS-REFERENCE TO RELATED APPLICATIONS

This application claims priority to Chinese Patent Application No. 201810699352.9, filed on Jun. 29, 2018, titled "Method and Apparatus for Displaying Interface," which is hereby incorporated by reference in its entirety.

TECHNICAL FIELD

Embodiments of the present disclosure relate to the field of data processing technology, and specifically to a method and apparatus for displaying an interface.

BACKGROUND

With the development of the science and technology, the smart devices are having more and more abundant functions. A user may set different smart devices for different scenarios to meet the needs in work and life, which improves the informatization level of the user. For example, when the user is driving a vehicle, an electronic map may be displayed through a GPS (Global Positioning System) device. When the user is in a living room, a music may be played through a smart audio system, and so on.

SUMMARY

Embodiments of the present disclosure provide a method and apparatus for displaying an interface.

In a first aspect, the embodiments of the present disclosure provide a method for displaying an interface. The method includes: acquiring device related information of a connected device; querying display interface information corresponding to the device related information of the connected device; and displaying a corresponding interface based on the display interface information.

In some embodiments, the device related information includes device type information of the connected device and/or scenario information of the connected device.

In some embodiments, the querying display interface information corresponding to the device related information of the connected device includes: querying the display interface information corresponding to the device type information of the connected device.

In some embodiments, the querying display interface information corresponding to the device related information of the connected device includes: querying display interface information corresponding to the scenario information of the connected device.

In some embodiments, the displaying a corresponding interface based on the display interface information includes: determining the interface according to the display interface information, the interface including at least one application interface; establishing, for an application interface in the at least one application interface, a connection between the application interface and a corresponding application; and displaying running status information of the corresponding application in the application interface.

In some embodiments, the displaying running status information of the corresponding application in the application interface includes: displaying, in response to a connection established between the connected device and the application, the running status information of the connected device in the application interface corresponding to the application.

In some embodiments, the interface includes a voice control application interface, and the voice control application interface is used to control the display interface information according to a received voice signal.

In some embodiments, the interface includes an information pushing interface, and the information pushing interface is used to display push information corresponding to the interface.

In some embodiments, the interface is constructed by: determining at least one application corresponding to the scenario information; setting, for an application in the at least one application, a display priority and an application status identifier for the application according to the scenario information, the application status identifier being used to represent running status information of the corresponding application; and setting, according to the display priority, an application interface for the application, and displaying the application status identifier in the corresponding application interface.

In a second aspect, the embodiments of the present disclosure provide an apparatus for displaying an interface. The apparatus includes: a device related information acquiring unit, configured to acquire device related information of a connected device; a display interface information querying unit, configured to query display interface information corresponding to the device related information of the connected device; and an interface displaying unit, configured to display a corresponding interface based on the display interface information.

In some embodiments, the device related information includes at least one of device type information of the connected device or scenario information of the connected device.

In some embodiments, the display interface information querying unit includes: a first querying subunit, configured to query display interface information corresponding to the device type information of the connected device.

In some embodiments, the display interface information querying unit includes: a second querying subunit, configured to query the display interface information corresponding to the scenario information of the connected device.

In some embodiments, the interface displaying unit includes: an interface determining subunit, configured to determine the interface according to the display interface information, the interface including at least one application interface; a connection establishing subunit, configured to establish, for an application interface in the at least one application interface, a connection between the application interface and a corresponding application; and a displaying subunit, configured to display running status information of the corresponding application in the application interface.

In some embodiments, the displaying subunit includes: a displaying module, configured to display, in response to a connection established between the connected device and the application, running status information of the connected device in the application interface corresponding to the application.

In some embodiments, the interface includes a voice control application interface, and the voice control application interface is used to control the display interface information according to a received voice signal.

In some embodiments, the interface includes an information pushing interface, and the information pushing interface is used to display push information corresponding to the interface.

In some embodiments, the apparatus includes an interface constructing unit, configured to construct the interface. The interface constructing unit includes: an application determining subunit, configured to determine at least one application corresponding to the scenario information; an information setting subunit, configured to set, for an application in the at least one application, a display priority and an application status identifier for the application according to the scenario information, the application status identifier being used to represent running status information of the corresponding application; and an interface constructing subunit, configured to set, according to the display priority, an application interface for the application, and display the application status identifier in the corresponding application interface.

In a third aspect, the embodiments of the present disclosure provide an electronic device. The electronic device includes: one or more processors; and a storage device, configured to store one or more programs. The one or more programs, when executed by the one or more processors, cause the one or more processors to implement the method for displaying an interface in the first aspect.

In a fourth aspect, the embodiments of the present disclosure provide a computer readable medium storing a computer program. The program, when executed by a processor, implements the method for displaying an interface in the first aspect.

According to the method and apparatus for displaying an interface provided by the embodiments of the present disclosure, the device related information of the device connected with a smart terminal is acquired. Then, the display interface information corresponding to the device related information of the connected device is queried. Finally, the corresponding interface is displayed based on the display interface information. Thus, the smart terminal can display the corresponding interface according to the connected device, thereby improving the efficiency of acquiring the information by the user.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
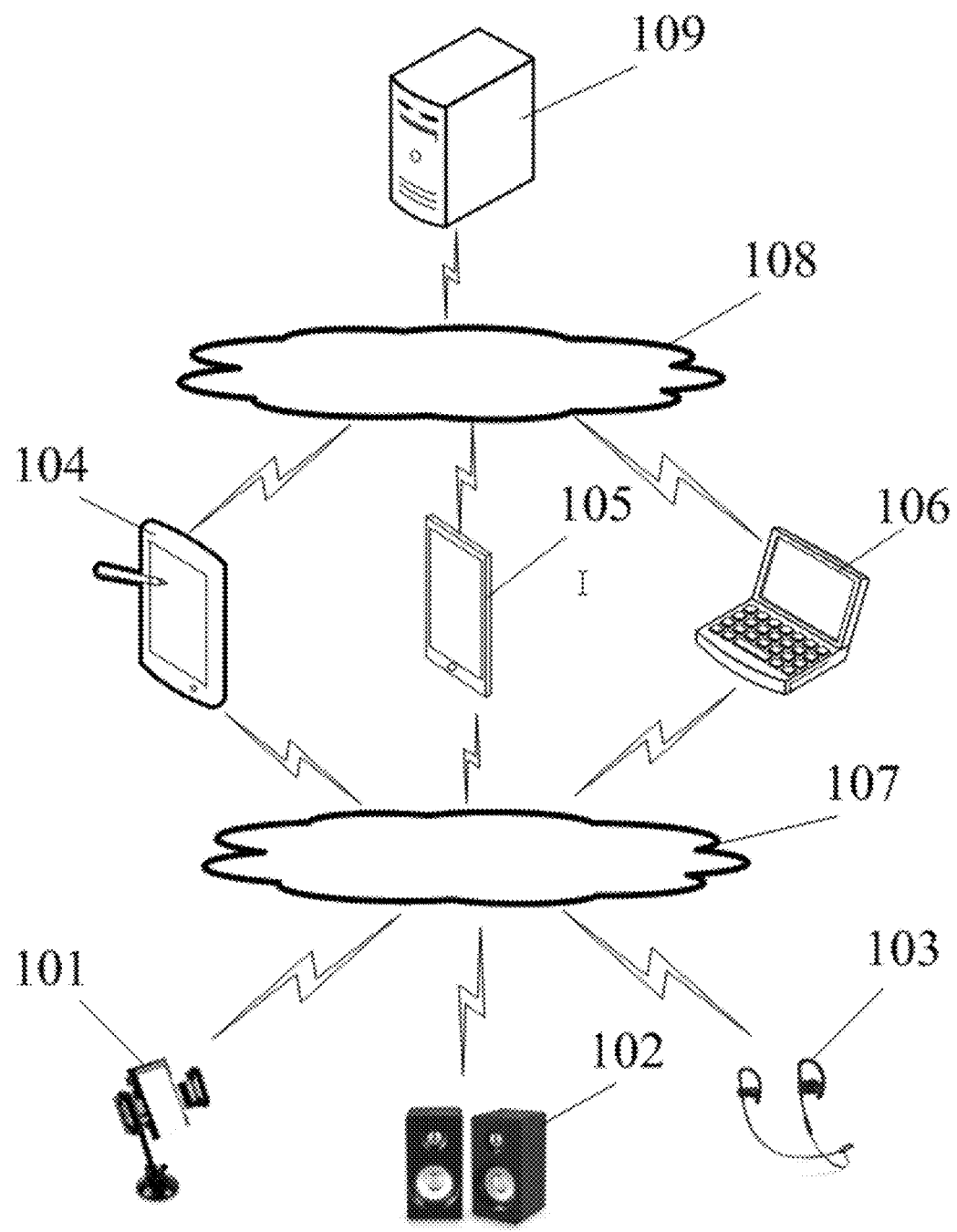
FIG. 1 is a diagram of an exemplary system architecture in which an embodiment of the present disclosure may be applied.

FIG. 1 shows an exemplary system architecture 100 in which a method for displaying an interface or an apparatus for displaying an interface according to an embodiment of the present disclosure may be applied.

As shown in FIG. 1, the system architecture 100 may 104, 105 and 106, networks 107 and 108, and a server 109. The network 107 serves as a medium providing a communication link between the smart terminals 104, 105 and 106 and the terminal devices 101, 102 and 103 in different environments. The network 108 serves as a medium providing a communication link between the smart terminals 104, 105 and 106 and the server 109. The networks 107 and 108 may include various types of connections, for example, wired or wireless communication links, or optical fiber cables.

A user may establish an interaction between the smart terminals 104, 105 and 106 and the terminal devices 101, 102 and 103 using the network 107, and establish an interaction between the smart terminals 104, 105 and 106 and the server 109 via the network 108. Various data processing applications (e.g., electronic map applications, music control applications, communication applications, instant communication tools, and social platform software) may be installed on the smart terminals 104, 105 and 106.

The smart terminals 104, 105 and 106 may be hardware or software. When being the hardware, the smart terminals 104, 105 and 106 may be various electronic devices having a display screen and supporting an interface control, which include, but not limited to, a smart phone, a tablet computer, a laptop portable computer and a desktop computer. When being the software, the smart terminals 104, 105 and 106 may be installed in the above listed electronic devices. The smart terminals may be implemented as a plurality of pieces of software or a plurality of software modules (e.g., software or software modules for providing a distributed service), or as a single piece of software or a single software module, which will not be specifically defined here.

The server 109 may be a server providing various services, for example, a server providing a support for an interface displayed on the smart terminals 104, 105 and 106. The server may adjust the interfaces of the smart terminals 104, 105 and 106 according to the terminal devices 101, 102 and 103 to which the smart terminals 104, 105 and 106 connect, to display corresponding information.

It should be noted that the method for displaying an interface provided by the embodiments of the present disclosure is generally performed by the smart terminals 104, 105 and 106. Correspondingly, the apparatus for displaying an interface is generally provided in the smart terminals 104, 105 and 106.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the smart terminals, the networks, and the servers in FIG. 1 are merely illustrative. Any number of terminal devices, smart terminals, networks, and servers may be provided based on actual requirements.

Figure 2:
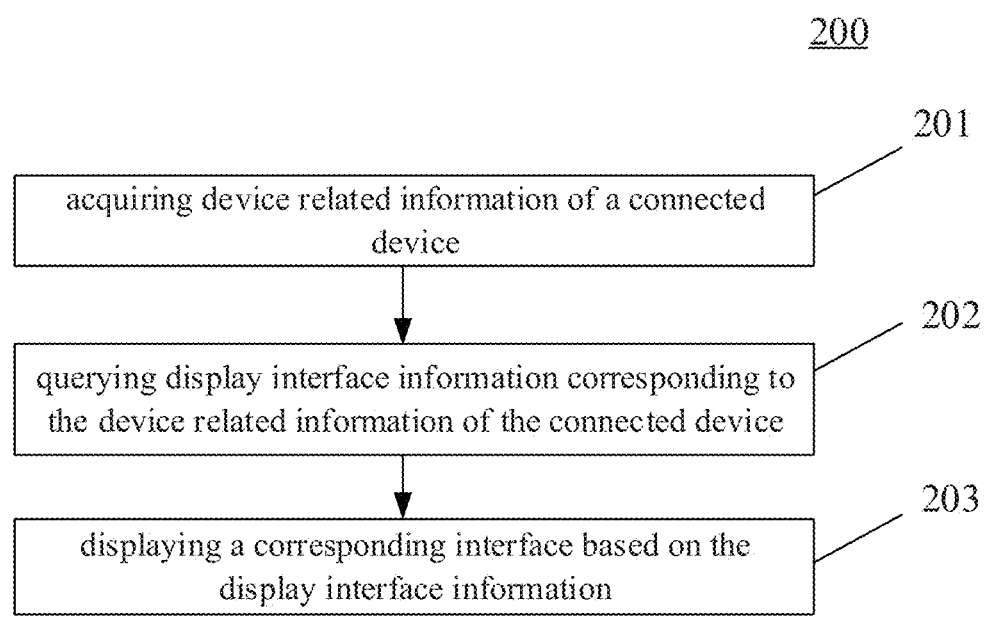
FIG. 2 is a flowchart of an embodiment of a method for displaying an interface according to the present disclosure.

Further referring to FIG. 2, a flow 200 of an embodiment of a method for displaying an interface according to the present disclosure is illustrated. The method for displaying an interface includes the following steps 201 to 203.

Step 201 includes acquiring device related information of a connected device.

In this embodiment, a performing subject (e.g., the smart terminals 104, 105 and 106 shown in FIG. 1) of the method for displaying an interface may establish a connection with the terminal devices 101, 102 and 103 (i.e., the connected device) by means of a wired connection or a wireless connection. It should be noted that the wireless connection may include, but not limited to, a 3G/4G connection, a WiFi connection, a Bluetooth connection, a WiMAX connection, a Zigbee connection, an UWB (ultra wideband) connection, and other wireless connections now known or developed in the future.

Generally, in a certain scenario, a user may set a smart device in the scenario to meet the needs of the user. For example, when driving a vehicle, the user generally concerns road condition information. In this case, a smart terminal may be used to display an electronic map. When needing to make or receive a call during the driving, the user generally needs to manually operate on the smart terminal to exit the electronic map interface to make or receive the call. For safety reasons, when operating on the smart terminal, the user may also park the vehicle in a vehicle stop zone. That is, in the certain scenario, the user may use a plurality of applications, but in this scenario, it is not suitable for the user to operate on an application of the smart terminal, or operate on the plurality of applications of the smart terminal at the same time.

To this end, the performing subject in the present disclosure may first establish the connection with the terminal devices 101, 102 and 103, and then acquire the device related information corresponding to the terminal devices 101, 102 and 103. The device related information may include information such as a device name, a device hardware composition, and a device software version. For example, the user may establish the connection between the smart terminal 105 and the terminal device 101 by Bluetooth or the like. If the terminal device 101 is a vehicle-mounted holder for placing the smart terminal 105, the smart terminal 105 may acquire the device related information of the terminal device 101 after the connection between the smart terminal 105 and the terminal device 101 is established. The device related information may refer to a Bluetooth name of the terminal device 101 (e.g., the Bluetooth name may be vehicle-mounted mobile phone holder), model information of the terminal device 101, etc.

In some alternative implementations of this embodiment, the device related information may include device type information of the connected device and/or scenario information of the connected device.

The device related information of the terminal devices 101, 102 and 103 may include various kinds of information. For example, the various kinds of information may be basic information, operating system information, network information, characteristic information, and auxiliary function information. Moreover, the device related information may further include the device type information and/or the scenario information. The device type information may be used to represent a hardware composition or a software composition of the connected device. The scenario information may be used to represent an application scenario of the connected device. For example, if the terminal device 101 is the vehicle-mounted mobile phone holder, the device type information corresponding to the terminal device 101 may be a mobile phone holder, and the scenario information may be a driving scenario. If the terminal device 102 is a home speaker, the device type information corresponding to the terminal device 102 may be a speaker, and the scenario information may be an indoor scenario. If the terminal device 103 is a sport earphone, the device type information corresponding to the terminal device 103 may be an earphone, and the scenario information may be an outdoor scenario or the like.

Step 202 includes querying display interface information corresponding to the device related information of the connected device.

Different terminal devices 101, 102 and 103 may be adapted to different application scenarios. After acquiring the device related information corresponding to a terminal device, the performing subject in the present disclosure may determine the display interface information of the device through the device related information. The display interface information may be used to adjust the interface attributes of an interface. The interface attributes may include information such as a layout, an image size, and a display brightness.

In some alternative implementations of this embodiment, the querying display interface information corresponding to the device related information of the connected device may include: querying display interface information responding corresponding to the device type information of the connected device.

The different terminal devices 101, 102, and 103 may have their respective application scenarios, and the needs of the user for applications in different application scenarios may also be different. After the user establishes the connection with the terminal devices 101, 102, and 103 via the performing subject, the performing subject in this embodiment may query the corresponding display interface information according to the device type information. For example, if the terminal device 102 is the home speaker, and the corresponding device type information is the speaker, the corresponding display interface information may adjust interface attributes such as an image and a layout position of a music application.

In some alternative implementations of this embodiment, the querying display interface information corresponding to the device related information of the connected device may include: querying display interface information corresponding to the scenario information of the connected device.

As may be seen from the above description, the device related information of the terminal devices 101, 102 and 103 may further include the scenario information. After the user establishes the connection with the terminal devices 101, 102, and 103 via the performing subject, the performing subject in this embodiment may query the corresponding display interface information according to the scenario information. For example, if the terminal device 102 is the home speaker, and the corresponding scenario information may be the indoor scenario, the corresponding display interface information may adjust interface attributes such as an image and a layout position of a music application according to the indoor scenario.

Step 203 includes displaying a corresponding interface based on the display interface information.

After obtaining the display interface information, the performing subject may adjust an interface required to be displayed on the screen of the performing subject according to the display interface information, and display the adjusted interface on the screen of the performing subject.

In some alternative implementations of this embodiment, the displaying a corresponding interface based on the display interface information may include the following steps 1 to 3.

Step 1 includes determining the interface according to the display interface information.

The connection between the user and the terminal devices 101, 102, and 103 established via the performing subject indicates that the user is in a close distance to the terminal devices 101, 102, and 103. Accordingly, it may be considered that the user and the terminal devices 101, 102 and 103 are within the same scenario. Thus, the device type information and/or the scenario information of the terminal devices 101, 102 and 103 may represent the scenario in which the user is located. The performing subject may construct an interface corresponding to the scenario in which the user is located according to the display interface information corresponding to the device type information and/or the scenario information, so that the interface can meet the needs of the user in the corresponding scenario. The interface may include at least one application interface. For example, if the terminal device 101 is the vehicle-mounted mobile phone holder, the device type information may be the mobile phone holder, and the scenario information may be a scenario inside the vehicle. Correspondingly, from the display interface information, interfaces corresponding to applications used by the user when driving may be found. For example, the interfaces may include an electronic map interface, a music interface, a phone interface, etc.

Step 2 includes establishing, for an application interface in the at least one application interface, a connection between the application interface and a corresponding application.

After determining the interface, the performing subject may find the application corresponding to the application interface included in the interface and being installed on the performing subject. Then, the performing subject may establish the connection between the application interface and the application corresponding to the application interface. For example, the application interfaces may include the electronic map interface, the music interface, and the phone interface. The performing subject may respectively find the map application, the music application, and the phone application installed on the performing subject. Then, a data connection between the electronic map interface and the map application, a data connection between the music interface and the music application, and a data connection between the phone interface and the phone application are respectively established.

Step 3 includes displaying running status information of the corresponding application in the application interface.

After establishing the data connection between the application interface and the application, the performing subject may display the running status information of the corresponding application in the application interface. For example, in the driving scenario, the application interfaces may include the electronic map interface, the music interface, and the phone interface. Correspondingly, each application interface respectively displays the running status information of the corresponding application. That is, the electronic map interface may display the location information of the vehicle in the electronic map. The music interface may display the music selected by the user. The telephone interface may display the current call status. In this way, the user may simultaneously acquire the running status information of a plurality of applications corresponding to the scenario on the interface of the performing subject. Accordingly, the capability of the performing subject to adapt to the scenario where the user is currently located is improved, and steps of operating the different applications by the user are reduced. Moreover, various kinds of information can be provided for the user at the same time. Thus, the efficiency for acquiring the information by the user is improved, and the needs of the user in the scenario are satisfied. In addition, establishing the connection between the performing subject and the terminal device improves the intelligence level of the terminal device and the security of the user in the scenario to some extent.

In some alternative implementations of this embodiment, the displaying running status information of the corresponding application in the application interface may include: displaying, in response to a connection established between the connected device and the application, running status information of the connected device in the application interface corresponding to the application.

After establishing the data connection with the connected device, the performing subject may determine the scenario in which the user is located according to the connected device, and display information corresponding to the scenario. If the connected device is relevant to the application corresponding to a certain application interface, a data connection between the connected device and the application may be established. For example, the terminal device is a vehicle-mounted speaker, and the interface corresponding to the scenario may include the music interface, a data connection between the music application and the vehicle-mounted speaker may be established, and then, the music played in the music application is played via the vehicle-mounted speaker. At the same time, the running status information of the vehicle-mounted speaker (the running status information may be the playing status of the currently played music) may be displayed in the application interface. In this way, through the connected device, the scenario where the user is located may be determined and the information corresponding to the scenario may be displayed. In addition, functions of applications may also be implemented through the connected device. Thus, the adaptability of the performing subject to the scenario where the user is located is improved. Meanwhile, after the data connection is established with the performing subject, the control for the connected device may also be implemented through the performing subject, which improves the intelligence level of the device and the user experience to some extent.

The performing subject may also establish connections with a plurality of devices at the same time. If the plurality of devices connected with the performing subject correspond to the same scenario information, the interface may be displayed as described above. If the plurality of devices correspond to different scenario information, a prompt signal (e.g., which may be a prompt window) may be sent. After the user determines certain scenario information, the above steps are performed.

In some alternative implementations of this embodiment, the interface may include a voice control application interface. The voice control application interface may be used to control the display interface information according to a received voice signal.

For some scenarios, it is not convenient for the user to manually operate on the performing subject. In this case, the interface may include the voice control application interface. The voice control application interface may monitor the voice signal sent by the user, determine the application on which the user wants to operate according to the voice signal, and then control the interface to display corresponding information. For example, when the performing subject is connected to the vehicle-mounted mobile phone holder, it may be considered that the user is in the driving scenario. Afterwards, the performing subject may determine the interface including the voice control application interface through the found display interface information. When needing to make a call, the user may send a voice signal, so that the voice control application corresponding to the voice control application interface recognizes the voice signal, and controls the phone application to dial the corresponding contact, to adapt to the needs of the user in the driving scenario.

In some alternative implementations of this embodiment, the interface may include an information pushing interface. The information pushing interface may be used to display push information corresponding to the interface.

For some scenarios, the user may need to acquire the information of the scenarios in time, in order to make a decision based on the information. For example, when being in the driving scenario, the user may promptly acquire road condition information or weather information through the information pushing interface, so that the user can promptly adjust the driving route according to the road condition information or the weather information.

Figure 3:
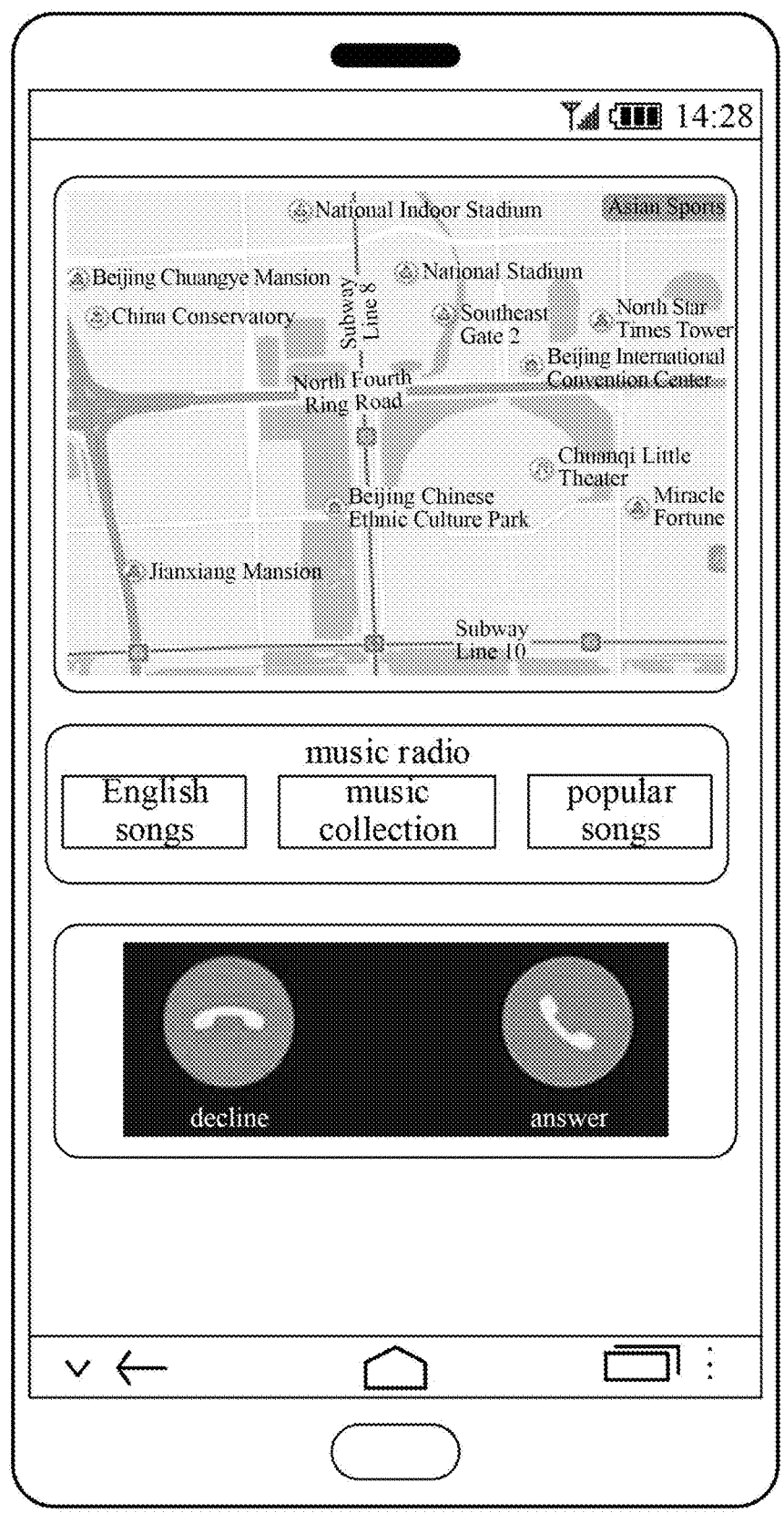
FIG. 3 is a schematic diagram of an application scenario of the method for displaying an interface according to the present disclosure.

Further referring to FIG. 3, FIG. 3 is a schematic diagram of an application scenario of the method for displaying an interface according to this embodiment. In the application scenario of FIG. 3, the user may establish the data connection with the terminal device 101 via the smart terminal 105. The smart terminal 105 acquires the device information of the terminal device 101 and determines that the current scenario is the driving scenario. Then, the smart terminal 105 invokes the installed electronic map application, music application, and phone application, and displays the interface including applications such as the electronic map application, the music application and the phone application on the screen of the smart terminal 105.

In the method provided by the above embodiment of the present disclosure, first, the device related information of the device connected with the smart terminal is acquired. Then, the display interface information corresponding to the device related information of the connected device is queried. Finally, the corresponding interface is displayed based on the display interface information. Thus, the smart terminal can display the corresponding interface according to the connected device, which improves the capability of the smart terminal to adapt to the scenario where the user is located and the efficiency of acquiring the information by the user.

Figure 4:
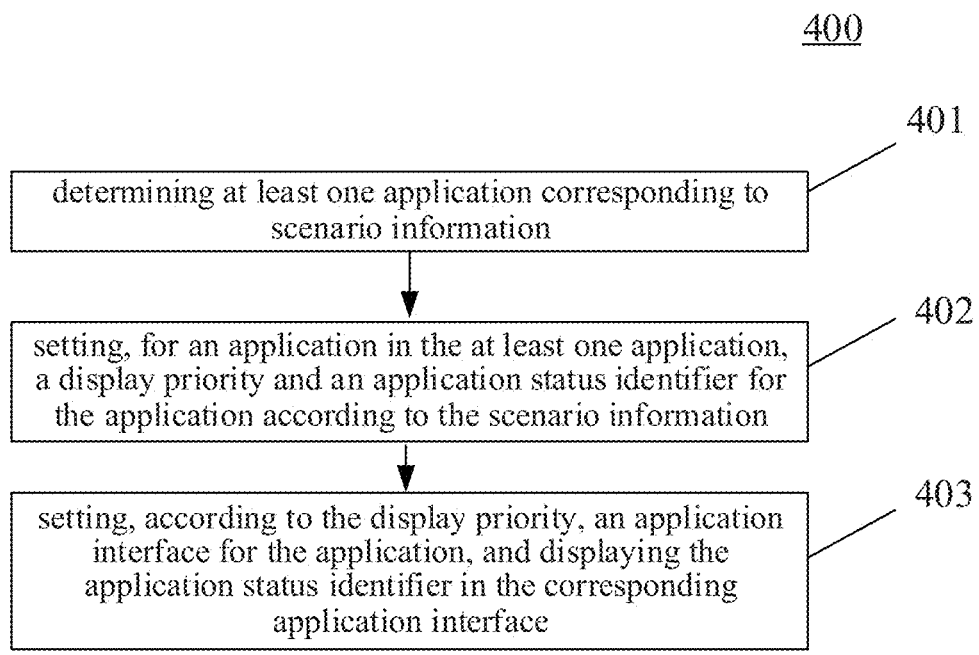
FIG. 4 is a flowchart of an embodiment of a construction of a display interface according to the present disclosure.

Further referring to FIG. 4, a flow 400 of an embodiment of a construction for a display interface is illustrated. The flow of constructing a display interface includes the following steps 401 to 403.

Step 401 includes determining at least one application corresponding to scenario information.

In this embodiment, a performing subject (e.g., the server 109 shown in FIG. 1) of a method for constructing a display interface may establish a data connection with the smart terminal devices 104, 105 and 106 by means of a wired connection or a wireless connection. It should be noted that the wireless connection may include, but not limited to, a 3G/4G connection, a WiFi connection, a Bluetooth connection, a WiMAX connection, a Zigbee connection, an UWB (ultra wideband) connection, and other wireless connections now known or developed in the future. The subject in this embodiment may preset a plurality of pieces of scenario information, and determine at least one application corresponding to each piece of scenario information in the plurality of pieces of scenario information. For example, the scenario information may include a driving scenario, an indoor scenario and an outdoor scenario. In the driving scenario, the performing subject may set applications commonly used by the user, including an electronic map application, a music application, a phone application, and the like. The performing subject may also set corresponding applications for other scenarios, which will not be described here one by one.

Step 402 includes setting, for an application in the at least one application, a display priority and an application status identifier according to the scenario information.

For different scenario information, needs of the user may be different. For example, in the driving scenario, an electronic map may be most needed by the user, a music may be less needed than the electronic map, and a phone may be needed only occasionally. To this end, the performing subject may set a highest display priority for the electronic map application, a lower display priority for the music application, and the lowest display priority for the phone application. Generally, the screens of the smart terminals 104, 105, 106 are not large. In order to display the running status information of the plurality of applications, the performing subject in this embodiment may set a corresponding application status identifier for each application. The application status identifier may be considered as a simplified identifier of the corresponding application, and the application status identifier may be used to identify the running status information of the corresponding application. For example, the interface of the electronic map application includes an electronic map, a search bar, user information, and various setting options. However, many functions of the interface of the electronic map application are not, always needed during the driving. To this end, the application status identifier corresponding to the electronic map application may merely display the electronic map, but does not display other information or functions. In this case, the corresponding running status information may be information displayed on the electronic map. The phone application may display information such as a profile picture of the user, a user name, a call duration, a connection identifier, and a disconnection identifier. The application status identifier corresponding to the phone application may only display the name of the call object, the connection identifier, and the disconnection identifier, but does not display information such as the user profile picture and the call duration. The corresponding running status information may be a connection status or a disconnection status. In this way, the information of the plurality of applications may be simultaneously displayed through the screens of the smart terminals 104, 105 and 106.

Step 403 includes setting, accord in to the display priority, an application interface for the application, and displaying the application status identifier in the corresponding application interface.

After setting the display priority and the application status identifier, the performing subject may set the application interface for the application in a descending order of the display priority. Then, the application status identifier is displayed in the application interface. Accordingly, the construction for the display interface is completed. It should be noted that the performing subject may set a plurality of application interfaces with different layouts. The user may select a display interface having a different layout on the smart terminals 104, 105, 106, or define a display interface by himself.

Figure 5:
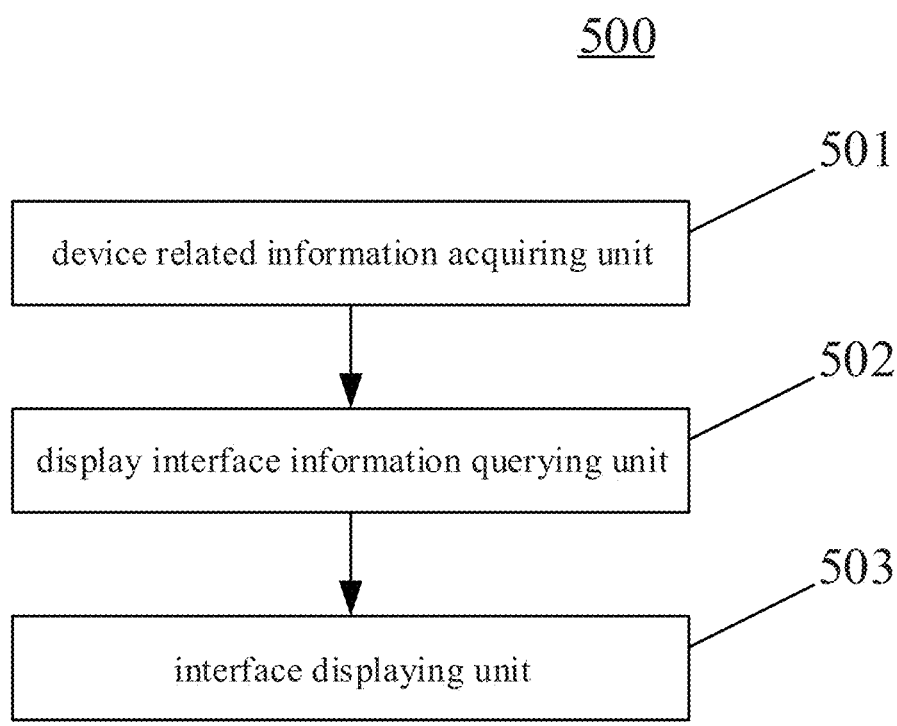
FIG. 5 is a schematic structural diagram of an embodiment of an apparatus for displaying an interface according to the present disclosure.

Further referring to FIG. 5, as an implementation of the method shown in the above drawings, the present disclosure provides an embodiment of an apparatus for displaying an interface. The embodiment of the apparatus corresponds to the embodiment of the method shown in FIG. 2, and the apparatus may be applied in various electronic devices.

As shown in FIG. 5, the apparatus 500 for displaying an interface in this embodiment includes: a device related information acquiring unit 501, a display interface information querying unit 502, and an interface displaying unit 503. The device related information acquiring unit 501 is configured to acquire device related information of a connected device. The display interface information querying unit 502 is configured to query display interface information corresponding to the device related information of the connected device. The interface displaying unit 503 is configured to display a corresponding interface based on the display interface information.

In some alternative implementations of this embodiment, the device related information includes device type information of the connected device and/or scenario information of the connected device.

In some alternative implementations of this embodiment, the display interface information querying unit 502 may include: a first querying subunit (not shown), configured to query display interface information corresponding to the device type information of the connected device.

In some alternative implementations of this embodiment, the display interface information querying unit 502 may include: a second querying subunit (not shown), configured to query display interface information corresponding to the scenario information of the connected device.

In some alternative implementations of this embodiment, the interface displaying unit 503 may include: an interface determining subunit (not shown), a connection establishing subunit (not shown) and a displaying subunit (not shown). The interface determining subunit is configured to determine the interface according to the display interface information, the interface including at least one application interface. The connection establishing subunit is configured to establish, for an application interface in the at least one application interface, a connection between the application interface and a corresponding application. The displaying subunit is configured to display running status information of the corresponding application in the application interface.

In some alternative implementations of this embodiment, the displaying subunit may include: a displaying module (not shown), configured to display, in response to a connection established between the connected device and the application, running status information of the connected device in the application interface corresponding to the application.

In some alternative implementations of this embodiment, the interface may include a voice control application interface, and the voice control application interface is used to control the display interface information according to a received voice signal.

In some alternative implementations of this embodiment, the interface may include an information pushing interface, and the information pushing interface is used to display push information corresponding to the interface.

In some alternative implementations of this embodiment, the apparatus 500 for displaying an interface may include an interface constructing unit (not shown), configured to construct the interface. The interface constructing unit may include: an application determining subunit (not shown), an information setting subunit (not shown), and an interface constructing subunit (not shown). The application determining subunit is configured to determine at least one application corresponding to the scenario information. The information setting subunit is configured to set, for an application in the at least one application, a display priority and an application status identifier for the application according to the scenario information, the application status identifier being used to represent running status information of the corresponding application. The interface constructing subunit is configured to set, according to the display priority, an application interface for the application, and display the application status identifier in the corresponding application interface.

This embodiment further provides an electronic device. The electronic device includes: one or more processors; and a storage device, configured to store one or more programs. The one or more programs, when executed by the one or more processors, cause the one or more processors to implement the method for displaying an interface.

This embodiment further provides a computer readable medium storing a computer program. The program, when executed by a processor, implements the method for displaying an interface.

Figure 6:
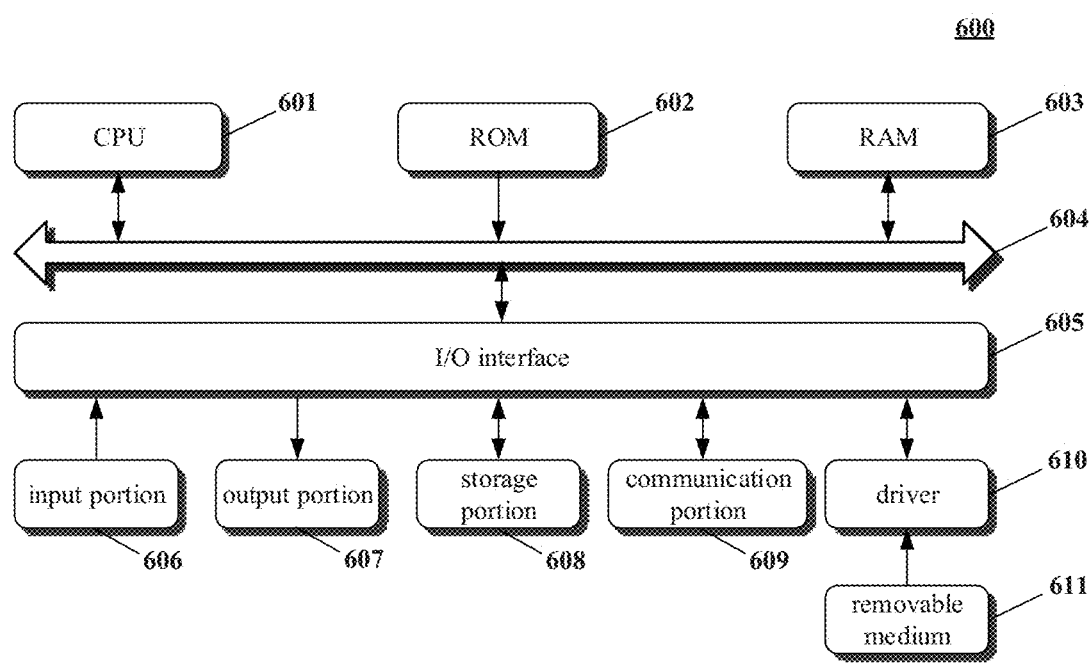
FIG. 6 is a schematic structural diagram of a computer system adapted to implement an electronic device according to the embodiments of the present disclosure.

Referring to FIG. 6, FIG. 6 illustrates a schematic structural diagram of a computer system 600 adapted to implement an electronic device (e.g., the smart terminals 104, 105 and 106 shown in FIG. 1) of the embodiments of the present disclosure. The electronic device shown in FIG. 6 is merely an example and should not impose any restriction on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 further stores various programs and data required by operations of the system 600. The CPU 601, the ROM 602 and the RAM 603 are connected to each other via a bus 604. An input/output (I/O) interface 605 is also connected to the bus 604.

The following components are connected to the I/O interface 605: an input portion 606 including a keyboard, a mouse. etc.; an output portion 607 including a liquid crystal display device (LCD), a speaker, etc.; a storage portion 608 including a hard disk and the like; and a communication portion 609 including a network interface card, for example, a LAN card and a modem. The communication portion 609 performs communication processes via a network such as the Internet. A driver 610 is also connected to the I/O interface 605 as required. A removable medium 611, for example, a magnetic disk, an optical disk, a magneto-optical disk, and a semiconductor memory, may be installed on the driver 610, to facilitate the installation of a computer program from the removable medium 611 on the storage portion 608 as needed.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure.

It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, comprising a device related information acquiring unit, a display interface information querying unit, and an interface displaying unit. The names of these units do not in some cases constitute a limitation to such units themselves. For example, the interface displaying unit may also be described as "a unit for displaying the interface."

In another aspect, the present disclosure further provides a computer readable medium. The computer readable medium may be the computer readable medium included in the apparatus described in the above embodiments, or a stand-alone computer readable medium not assembled into the apparatus. The computer readable medium stores one or more programs. The one or more programs, when executed by the apparatus, cause the apparatus to: acquire device related information of a connected device, query display interface information corresponding to the device related information of the connected device, and display a corresponding interface based on the display interface information.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for displaying an interface, comprising:
    acquiring device related information of a connected device, the device related information comprising scenario information representing an application scenario of the connected device;
    querying display interface information corresponding to the device related information of the connected device, the display interface information being used to adjust interface attributes of the interface; and
    displaying a corresponding interface based on the display interface information;
    wherein the interface is constructed by:
    determining at least one installed application corresponding to the scenario information representing the application scenario of the connected device;
    setting, for an application in the at least one installed application, a display priority and an application status identifier for the application according to the scenario information representing the application scenario of the connected device, the application status identifier being used to represent running status information of the corresponding application; and
    setting, according to the display priority, an application interface for the application, and displaying the application status identifier in the corresponding application interface.

2. The method according to claim 1, wherein the device related information further comprises device type information of the connected device.

3. The method according to claim 2, wherein the querying display interface information corresponding to the device related information of the connected device comprises:

querying the display interface information corresponding to the device type information of the connected device.

4. The method according to claim 2, wherein the querying display interface information corresponding to the device related information of the connected device comprises:

querying the display interface information corresponding to the scenario information of the connected device.

5. The method according to claim 1, wherein the displaying a corresponding interface based on the display interface information comprises:

determining the interface according to the display interface information, the interface including at least one application interface;

establishing, for an application interface in the at least one application interface, a connection between the application interface and a corresponding application; and displaying running status information of the corresponding application in the application interface.

6. The method according to claim 5, wherein the displaying running status information of the corresponding application in the application interface comprises:

displaying, in response to a connection established between the connected device and the application, the running status information of the connected device in the application interface corresponding to the application.

7. The method according to claim 1, wherein the interface comprises a voice control application interface, and the voice control application interface is used to control the display interface information according to a received voice signal.

8. The method according to claim 1, wherein the interface comprises an information pushing interface, and the information pushing interface is used to display push information corresponding to the interface.

9. An apparatus for displaying an interface, comprising:
at least one processor; and
a memory storing instructions, wherein the instructions when executed by the at least one processor, cause the at least one processor to perform operations, the operations comprising:
acquiring device related information of a connected device, the device related information comprising scenario information representing an application scenario of the connected device;
querying display interface information corresponding to the device related information of the connected device, the display interface information being used to adjust interface attributes of the interface; and
displaying a corresponding interface based on the display interface information;
wherein the interface is constructed by:
determining at least one installed application corresponding to the scenario information representing the application scenario of the connected device;
setting, for an application in the at least one installed application, a display priority and an application status identifier for the application according to the scenario information representing the application scenario of the connected device, the application status identifier being used to represent running status information of the corresponding application; and setting, according to the display priority, an application interface for the application, and displaying the application status identifier in the corresponding application interface.

10. The apparatus according to claim 9, wherein the device related information further comprises device type information of the connected device.

11. The apparatus according to claim 10, wherein the querying display interface information corresponding to the device related information of the connected device comprises:

querying the display interface information corresponding to the device type information of the connected device.

12. The apparatus according to claim 10, wherein the querying display interface information corresponding to the device related information of the connected device comprises:

querying the display interface information corresponding to the scenario information of the connected device.

13. The apparatus according to claim 9, wherein the displaying a corresponding interface based on the display interface information comprises:

determining the interface according to the display interface information, the interface including at least one application interface;

establishing, for an application interface in the at least one application interface, a connection between the application interface and a corresponding application; and displaying running status information of the corresponding application in the application interface.

14. The apparatus according to claim 13, wherein the displaying running status information of the corresponding application in the application interface comprises:

displaying, in response to a connection established between the connected device and the application, the running status information of the connected device in the application interface corresponding to the application.

15. The apparatus according to claim 9, wherein the interface comprises a voice control application interface, and the voice control application interface is used to control the display interface information according to a received voice signal.

16. The apparatus according to claim 9, wherein the interface comprises an information pushing interface, and the information pushing interface is used to display pushing information corresponding to the interface.

17. A non-transitory computer readable medium, storing a computer program, wherein the program, when executed by a processor, causes the processor to perform operations, the operations comprising:
acquiring device related information of a connected device, the device related information comprising scenario information representing an application scenario of the connected device;
querying display interface information corresponding to the device related information of the connected device, the display interface information being used to adjust interface attributes of the interface; and
displaying a corresponding interface based on the display interface information;
wherein the interface is constructed by:
determining at least one installed application corresponding to the scenario information representing the application scenario of the connected device;
setting, for an application in the at least one installed application, a display priority and an application status identifier for the application according to the scenario information representing the application scenario of the connected device, the application status identifier being used to represent running status information of the corresponding application; and setting, according to the display priority, an application interface for the application, and displaying the application status identifier in the corresponding application interface.

* * * * *